United States Patent [19]

Broemer et al.

[11] Patent Number: 4,857,487

[45] Date of Patent: Aug. 15, 1989

[54] OPTICAL FLUOROPHOSPHATE GLASSES POSSESSING POSITIVE ANOMALOUS PARTIAL DISPERSION AND IMPROVED PHYSICO-CHEMICAL PROPERTIES, AND A PROCESS FOR THEIR PREPARATION

[75] Inventors: Heinz Broemer, Wetzlar; Werner Huber; Norbert Meinert, both of Solms-Albshausen, all of Fed. Rep. of Germany

[73] Assignee: Ernst Leitz Wetzlar GmbH, Wetzlar, Fed. Rep. of Germany

[21] Appl. No.: 268,634

[22] Filed: Nov. 8, 1988

Related U.S. Application Data

[63] Continuation of Ser. No. 63,436, Jun. 18, 1987, abandoned, which is a continuation-in-part of PCT DE86/00413 filed Oct. 17, 1986.

[30] Foreign Application Priority Data

Oct. 19, 1985 [DE] Fed. Rep. of Germany ....... 3537293
Oct. 11, 1986 [DE] Fed. Rep. of Germany ....... 3634676

[51] Int. Cl.$^4$ .................. C03C 3/247; C03C 4/00
[52] U.S. Cl. ......................... 501/44; 501/902
[58] Field of Search .................... 501/44, 902

[56] References Cited

U.S. PATENT DOCUMENTS

| | | | |
|---|---|---|---|
| 3,492,136 | 1/1970 | Brömer et al. | 501/44 |
| 3,508,937 | 4/1970 | Bromer et al. | 501/44 |
| 3,671,276 | 6/1972 | Bromer et al. | 501/44 |
| 4,040,846 | 8/1977 | Broemer et al. | 501/44 |
| 4,225,459 | 9/1980 | Faulstich | 501/44 |
| 4,386,163 | 5/1983 | Kodama | 501/44 |

Primary Examiner—Mark L. Bell
Attorney, Agent, or Firm—Foley & Lardner, Schwartz, Jeffery, Schwaab, Mack, Blumehthal & Evans

[57] ABSTRACT

Optical fluorophosphate glasses based on $Ba(PO_3)_2$, $Al(PO_3)_3$, alkaline earth metal fluorides and $AlF_3$ are described which have a refactive index $n_e$ between 1.47 and 1.50, an Abbe-value $\nu_e$ between 85 and 80 and a positive anomalous partial dispersion value $\Delta\nu_e$ between $+17$ and $+22$. They comprise (in wt.—%) 0.5–3 Mg, 8–10 Ca, 12–20 Sr, 9–12 Ba, 7–9 Al, 5–9 P, 8–12 O and 35–38 F. Ti, Na, K and H may additionally be present. The improved physico-chemical parameters (expansion coefficient, glass transition temperature, density, Knoop-hardness) and the transmission characteristics are given, and a process for producing these optical glasses is described.

4 Claims, No Drawings

OPTICAL FLUOROPHOSPHATE GLASSES POSSESSING POSITIVE ANOMALOUS PARTIAL DISPERSION AND IMPROVED PHYSICO-CHEMICAL PROPERTIES, AND A PROCESS FOR THEIR PREPARATION

This application is a continuation of application Ser. No. 063,436, filed June 18, 1987, now abandoned.

This application is a continuation-in-part of international application No. PCT/DE86/00413, filed Oct. 17, 1986, designating The United States of America.

BACKGROUND OF THE INVENTION

This application relates to optical fluorophosphate glasses which are based on $Ba(PO_3)_2$, $Al(PO_3)_3$, alkaline earth metal fluorides and $AlF_3$ with improved physico-chemical properties and to a process for their preparation.

Fluorophosphate glasses with positive anomalous partial dispersion have long been employed for the production of apochromatic microscope lenses. Over the past few years, however, the use of these glasses has also greatly increased in the photooptics sector, especially for wide-angle telephoto lenses. Without these glasses, it is impossible to produce well corrected telephoto lenses having a long focal length.

Compared with the standard silicate and borosilicate glasses, however, fluorophosphate glasses, with their outstanding optical properties, have the disadvantage that their other physical properties, such as for example, the linear thermal expansion coefficient, the glass transition temperature and the Knoop hardness, are not optimum. This has the result that difficulties and complaints may arise during processing of the lenses and during subsequent use.

For applications in microoptics, where the lens diameters involved are only a few millimeters, these problems are relatively easy to overcome. On the other hand, a different situation is encountered in the production of lenses for long-focal-length telephoto lens systems, some of which have lens diameters of more than 200 mm.

SUMMARY OF THE INVENTION

It is therefore the object of the present invention to provide optical glasses of this type for which their extreme optical data (refractive index, Abbe value and anomalous partial dispersion) are retained while the physico-chemical properties of these glasses are improved so that optical components, such as lenses, prisms and the like, produced from the glasses according to the invention can be processed without difficulty, the range of uses of such glasses is extended, and a substantial cost saving is achieved in the production of lenses of this type.

It is a further object to provide a process for stria-free melting of these glasses in large units.

In accordance with one aspect of the invention, these objects are achieved by providing an optical fluorophosphate glass based on $Ba(PO_3)_2$, $Al(PO_3)_3$, alkaline earth metal fluorides and $AlF_3$, said glass having a refractive index $n_e$ of between 1.47 and 1.50, an Abbe-value $\nu_e$ of between 85 and 80 and a positive anomalous partial dispersion value $+\Delta\nu_e$ of between 17 and 22, and having:

(a) the following atomic composition (in wt.-%):

| | |
|---|---|
| Mg | 0.5–3.0 |
| Ca | 8–10 |
| Sr | 12–20 |
| Ba | 9–12 |
| Al | 7–9 |
| Ti | 0–1 |
| Na | 0–1 |
| K | 0–3 |
| P | 5–9 |
| O | 8–12 |
| F | 35–38 |
| H | 0–0.5 and |

(b) the following physical characteristics: Linear thermal expansion coefficient

| | |
|---|---|
| $\alpha 20/300°$ C. $[10^{-6} \cdot 1/°C.]$: | 14.6–14.7; |
| Glass transition temp. $T_g$: | 472–480° C.; |
| Density $\zeta$: | 3.51–3.61 g/cm$^3$; |
| Knoop-hardness HK: | 385–390. |

In a preferred embodiment, the glass of the invention is characterized in that it has an index of refraction $n_e$ between 1.48 and 1.49, an Abbe-value $\nu_e$ between 84.1 and 81.4 and a positive anomalous partial dispersion value $+\Delta\nu_e$ between 18.2 and 21.0, and the following atomic composition (in wt.-%):

| | |
|---|---|
| Mg | 1.0–2.2 |
| Ca | 9.1–9.8 |
| Sr | 13.1–19.0 |
| Ba | 10.0–10.8 |
| Al | 8.2–8.5 |
| Ti | 0–0.2 |
| Na | 0–0.4 |
| K | 0–1.9 |
| P | 6.1–7.1 |
| O | 9.4–11.0 |
| F | 36.0–36.2 |
| H | 0–0.1. |

Glass according to the invention preferably has an index of refraction $n_e$ of 1.48, an Abbe-value $\nu_e$ of 84.1 and a positive anomalous partial dispersion value $+\Delta\nu_e$ of 21, and (a) the following atomic composition (in wt.-%):

| | |
|---|---|
| Mg | 1.1 |
| Ca | 9.8 |
| Sr | 19.0 |
| Ba | 10.0 |
| Al | 8.5 |
| P | 6.1 |
| O | 9.4 |
| F | 36.1 and |

(b) the following physical characteristics: Linear thermal expansion coefficient

| | |
|---|---|
| $\alpha 20/300°$ C. $[10^{-6} \cdot 1/°C.]$: | 14.7; |
| Glass transition temp. $T_g$: | 480° C.; |
| Density $\zeta$: | 3.61 g/cm$^3$; |
| Knoop-hardness HK: | 385. |

A particularly preferred glass according to the invention has a refractive index of $n_e$ of 1.487, an Abbe-value $\nu_e$ of 81.4 and a positive anomalous partial dispersion value $+\Delta\nu_e$ of 18.2, and (a) the following atomic composition (in wt.-%):

| | |
|---|---|
| Mg | 2.18 |
| Ca | 9.19 |
| Sr | 13.18 |
| Ba | 10.78 |
| Al | 8.22 |
| Ti | 0.12 |
| Na | 0.36 |
| K | 1.85 |
| P | 7.07 |
| O | 10.95 |
| F | 36.06 |
| H | 0.04 and |

(b) the following physical characteristics: Linear thermal expansion coefficient

| | |
|---|---|
| $\alpha 20/300°$ C. $[10^{-6} \cdot 1/°C.]$: | 14.6; |
| Glass transition temp. $T_g$: | 472° C.; |
| Density $\zeta$: | 3.51 g/cm$^3$; |
| Knoop-hardness HK: | 390. |

According to a further aspect of the invention, the objects are achieved by providing a process for producing an optical fluorophosphate glass having a refractive index $n_e$ between 1.47 and 1.50, an Abbe-value $\nu_e$ between 85 and 80 and a positive anomalous partial dispersion value $+\Delta\nu_e$ between 17 and 22, wherein said glass is molten from a mixture which has the following composition (in weight-%):

| | |
|---|---|
| Ba(PO$_3$)$_2$ | 18–20 |
| Al(PO$_3$)$_3$ | 4–7 |
| MgF$_2$ | 1.5–4 |
| CaF$_2$ | 18–20 |
| SrF$_2$ | 25–29 |
| BaF$_2$ | 0.5–2 |
| AlF$_3$ | 22–26. |

Glass according to the invention is advantageously produced by a process in which the glass is molten from a mixture which has the following composition (in weight-%):

| | |
|---|---|
| Ba(PO$_3$)$_2$ | 19.7 |
| Al(PO$_3$)$_3$ | 5.6 |
| MgF$_2$ | 2.8 |
| CaF$_2$ | 19.1 |
| SrF$_2$ | 27.3 |
| BaF$_2$ | 1.0 |
| AlF$_3$ | 24.5. |

According to yet another aspect of the invention, the objects are achieved by providing a process for producing an optical fluorophosphate glass having a refractive index $n_e$ between 1.47 and 1.50, an Abbe-value $\nu_e$ between 85 and 80 and a positive anomalous partial dispersion value $+\Delta\nu_e$ between 17 and 22, wherein said glass is molten from a mixture which has the following composition (in weight-%):

| | |
|---|---|
| NaPO$_3$ | 1–3 |
| Ba(PO$_3$)$_2$ | 4–6 |
| Al(PO$_3$)$_3$ | 14–17 |
| MgF$_2$ | 4–7 |
| CaF$_2$ | 16–19 |
| SrF$_2$ | 17–20 |
| BaF$_2$ | 9–12 |
| AlF$_3$ | 19–22 |
| KHF$_2$ | 2–5 |

-continued

| | |
|---|---|
| K$_2$TiF$_6$ | 0.5–1. |

In a preferred glass producing process, the mixture has the following composition (in weight-%):

| | |
|---|---|
| NaPO$_3$ | 1.6 |
| Ba(PO$_3$)$_2$ | 5.0 |
| Al(PO$_3$)$_3$ | 15.7 |
| MgF$_2$ | 5.6 |
| CaF$_2$ | 17.9 |
| SrF$_2$ | 18.9 |
| BaF$_2$ | 10.8 |
| AlF$_3$ | 20.6 |
| KHF$_2$ | 3.3 |
| K$_2$TiF$_6$ | 0.6. |

The process for producing glass according to the invention is characterized in that it is carried out according to the following steps:
(a) introducing the mixture in portions, in the course of 90 minutes, into a platinum crucible heated to about 850° C.;
(b) increasing the melt temperature to 1,050°–1,100° C. within a period of up to 15 minutes;
(c) interval stirring at a stirring speed of about 150 revolutions per minute over a period of up to 25 minutes;
(d) reducing the temperature to 885°–920° C. and reducing the stirring speed to about 120 revolutions per minute;
(e) further reducing the temperature to 695°–725° C. and the stirring speed to about 80 revolutions per minute until the melt is bubble-free;
(f) casting in aluminum molds preheated to about 500° C.; and
(g) fine annealing in a furnace.

In a particularly preferred embodiment, the process for producing glass according to the invention is carried out according to the following steps:
(a) introducing the starting mixture in portions, in the course of 90 minutes, into a platinum crucible heated to 850° C.;
(b) increasing the melt temperature to 1,080° C. within a period of 15 minutes;
(c) interval stirring at a stirring speed of 150 revolutions per minute over a period of 25 minutes;
(d) reducing the temperature to 900° C. and reducing the stirring speed to 120 revolutions per minute;
(e) further reducing the temperature to 710° C. and the stirring speed to 80 revolutions per minute until the melt is bubble-free;
(f) casting in aluminum molds preheated to 500° C.; and
(g) fine annealing in a tempering furnace.

DETAILED DESCRIPTION OF PREFERRED EMBODIMENTS

In the following Table 1, the optical and physicochemical properties of a commercial glass are compared with the corresponding properties of a glass according to the invention (glass No. 1).

TABLE 1

| Known glass | Parameter | Glass No. 1 according to the invention |
|---|---|---|
| 1.4879 | $n_e$ | 1.4879 |
| 84.1 | $\nu_e$ | 84.1 |

TABLE 1-continued

| Known glass | Parameter | Glass No. 1 according to the invention |
|---|---|---|
| 0.4773 | $v_g'$ | 0.4773 |
| +21.0 | $\Delta v_e$ | +21.0 |
| 16.0 | $\alpha 20/300°$ C. $[10^{-6} \cdot 1/°C.]$ | 14.7 |
| 405 | $T_g$ [°C.] | 480 |
| 3.73 | $\zeta$ [g/cm$^3$] | 3.61 |
| 360 | HK | 385 |

The first four stated parameters designate optical properties and have the following meanings:

$n_e$ = refractive index
$v_e$ = Abbe number (reciprocal of the dispersion)
$\theta_g'$ = (actual) anomalous partial dispersion,
where $$\theta_g' = \frac{n_g - n_F}{n_F - n_C}$$

in which the subscript indices have the following meanings:
g = blue mercury line (435.84 nm);
F' = blue cadmium line (479.99 nm);
C' = red cadmium line (643.85 nm);
+$\Delta v_e$ = positive deviation from the "normal lines", as illustrated graphically in, for example, the drawing of German Pat. No. 1,496,563 or the corresponding U.S. Pat. No. 3,451,829. This difference is designated the "positive anomalous partial dispersion value".

The four lower parameters designate physicochemical properties, i.e.:

$\alpha_{20/300°C.}$ = linear thermal expansion coefficient $[10^{-6}.1/°C.]$
$T_g$ = glass transition temperature [°C.]
$\zeta$ = density [g/cm$^3$]
HK = Knoop hardness.

Glass No. 1 according to the invention has the following transmission characteristics:

| $\lambda$[nm] | $\tau_i$ (5 mm) | $\tau_i$ (25 mm) |
|---|---|---|
| 1014.0 | 0.998 | 0.990 |
| 700.0 | 0.999 | 0.993 |
| 660.0 | 0.998 | 0.990 |
| 620.0 | 0.997 | 0.988 |
| 580.0 | 0.997 | 0.985 |
| 546.1 | 0.997 | 0.985 |
| 500.0 | 0.995 | 0.978 |
| 460.0 | 0.993 | 0.965 |
| 435.8 | 0.990 | 0.953 |
| 420.0 | 0.992 | 0.961 |
| 404.7 | 0.991 | 0.958 |
| 400.0 | 0.991 | 0.958 |
| 390.0 | 0.985 | 0.927 |
| 380.0 | 0.980 | 0.905 |
| 370.0 | 0.975 | 0.882 |
| 365.0 | 0.972 | 0.866 |
| 350.0 | 0.941 | 0.737 |
| 334.1 | 0.875 | 0.512 |
| 320.0 | 0.752 | 0.240 |
| 310.0 | 0.607 | 0.082 |
| 300.0 | 0.429 | 0.015 |
| 290.0 | 0.253 | 0.001 |
| 280.0 | 0.127 | — |

In the table:
$\lambda$ denotes the wavelength used for the measurement [nm];
$\tau_i$ (5 mm) denotes the internal transmittance of a 5 mm thick glass plate;
$\tau_i$ (25 mm) denotes the internal transmittance of a 25 mm thick glass plate.

The obtained glass exhibits a low level of fluorescence and can be pressed to lens blanks having large diameters. It is also stria-free.

In the following Table 2 another commercial glass is compared with another embodiment according to the invention (glass No. 2):

TABLE 2

| Commercial glass | Parameter | Glass No. 2 according to the invention |
|---|---|---|
| 1.4874 | $n_e$ | 1.4874 |
| 81.4 | $v_e$ | 81.4 |
| 0.4772 | $v_g'$ | 0.4772 |
| +18.2 | $\Delta v_e$ | +18.2 |
| 16.0 | $\alpha 20/300°$ C. $[10^{-6} \cdot 1/°C.]$ | 14.6 |
| 434 | $T_g$ [°C.] | 472 |
| 3.64 | $\zeta$ [g/cm$^3$] | 3.51 |
| 360 | HK | 390 |

The transmission characteristics of glass No. 2 are given in the following listing:

| $\lambda$[nm] | $\tau_i$ (5 mm) | $\tau_i$ (25 mm) |
|---|---|---|
| 1014.0 | 0.999 | 0.995 |
| 700.0 | 0.999 | 0.995 |
| 660.0 | 0.998 | 0.993 |
| 620.0 | 0.998 | 0.990 |
| 580.0 | 0.997 | 0.988 |
| 546.1 | 0.997 | 0.988 |
| 500.0 | 0.995 | 0.978 |
| 460.0 | 0.993 | 0.965 |
| 435.8 | 0.991 | 0.956 |
| 420.0 | 0.991 | 0.958 |
| 404.7 | 0.991 | 0.958 |
| 400.0 | 0.991 | 0.956 |
| 390.0 | 0.983 | 0.919 |
| 380.0 | 0.972 | 0.866 |
| 370.0 | 0.966 | 0.841 |
| 365.0 | 0.958 | 0.807 |
| 350.0 | 0.901 | 0.595 |
| 334.1 | 0.760 | 0.253 |
| 320.0 | 0.527 | 0.040 |
| 310.0 | 0.325 | 0.004 |
| 300.0 | 0.151 | — |
| 290.0 | 0.054 | — |

This glass also is colorless and exhibits few striae and bubbles. It is also very substantially fluorescence-free and can be molded to give lens blanks having a large diameter. Tables 1 and 2 clearly show that the physicochemical parameters have been substantially improved. Thus, it was possible to reduce the linear thermal expansion coefficient by 8.1 and 8.7%; the glass transition temperature was increased by 18.5% in the case of glass No. 1 and by 8.8% in the case of glass No. 2; it was possible to reduce the density by 3.2% and by 3.6% and to increase the Knoop hardness by 6.9% and 8.3%. It must be emphasized that these technological improvements in the properties of the specific material have been achieved while maintaining the optical positional parameters ($n_e$, $v_e$, $\Delta v_e$), which are of primary importance.

In the following Table 3, the chemical components of the starting mixture of glass No. 1 are stated in mole percent (mole-%) and in weight percent (wt.-%). Furthermore, the elemental analysis (i.e., the weight percent proportions of the individual elements) was also listed. For example, Ba(PO$_3$)$_2$ which is present in an amount of 19.7% by weight, can be divided up into 9.2 wt.-% barium, 4.1 wt.-% phosphorus and 6.4 wt.-% oxygen.

TABLE 3

| Glass No. 1 | Mole % | Wt. % | Wt. % Individual Elements | | | | | |
|---|---|---|---|---|---|---|---|---|
| Ba(PO$_3$)$_2$ | 7.50 | 19.7 | Ba | 9.20 | P | 4.10 | O | 6.40 |
| Al(PO$_3$)$_3$ | 2.35 | 5.6 | Al | 0.57 | P | 2.00 | O | 3.03 |
| MgF$_2$ | 5.04 | 2.8 | Mg | 1.09 | F | 1.71 | | |
| CaF$_2$ | 27.44 | 19.1 | Ca | 9.80 | F | 9.30 | | |
| SrF$_2$ | 24.30 | 27.3 | Sr | 19.02 | F | 8.28 | | |
| BaF$_2$ | 0.67 | 1.0 | Ba | 0.08 | F | 0.20 | | |
| AlF$_3$ | 32.70 | 24.5 | Al | 7.87 | F | 16.63 | | |

Summing all the resulting amounts of atoms in Table 3 gives the following composition (in wt.-%):

| | |
|---|---|
| Mg | 1.09 |
| Ca | 9.80 |
| Sr | 19.02 |
| Ba | 10.00 |
| Al | 8.44 |
| P | 6.10 |
| O | 9.43 |
| F | 36.12 |
| Σ = | 100.00% |

In a similar manner, in the following Table 4 the starting mixture is given for glass No. 2 in mole-% and in % by weight as well as the corresponding atomic analysis in weight-%.

TABLE 4

| Glass No. 2 | Mole % | Wt. % | Wt. % Individual Elements | | | | | |
|---|---|---|---|---|---|---|---|---|
| NaPO$_3$ | 1.72 | 1.6 | Na | 0.36 | P | 0.49 | O | 0.75 |
| Ba(PO$_3$)$_2$ | 1.85 | 5.0 | Ba | 2.32 | P | 1.05 | O | 1.63 |
| Al(PO$_3$)$_3$ | 6.52 | 15.7 | Al | 1.60 | P | 5.53 | O | 8.57 |
| MgF$_2$ | 9.83 | 5.6 | Mg | 2.18 | F | 3.42 | | |
| CaF$_2$ | 25.10 | 17.9 | Ca | 9.19 | F | 8.71 | | |
| SrF$_2$ | 16.47 | 18.9 | Sr | 13.18 | F | 5.72 | | |
| BaF$_2$ | 6.75 | 10.8 | Ba | 8.46 | F | 2.34 | | |
| AlF$_3$ | 26.87 | 20.6 | Al | 6.62 | F | 13.98 | | |
| KHF$_2$ | 4.62 | 3.3 | K | 1.65 | F | 1.61 | H | 0.04 |
| K$_2$TiF$_6$ | 0.27 | 0.6 | K | 0.20 | F | 0.28 | Ti | 0.12 |

A summation of the atomic analysis from Table 4 yields (in wt.-%):

| | |
|---|---|
| Na | 0.36 |
| K | 1.85 |
| Mg | 2.18 |
| Ca | 9.19 |
| Sr | 13.18 |
| Ba | 10.78 |
| Al | 8.22 |
| Ti | 0.12 |
| P | 7.07 |
| O | 10.95 |
| F | 36.06 |
| H | 0.04 |
| Σ = | 100.00% |

The procedure for a 10 kg melt is described below. The weighed material is preferably mixed mechanically and is introduced in small portions into a platinum crucible whose temperature is kept constant at approximately 850° C. until the entire mixture has melted. The introduction of material takes about 90 minutes. Thereafter, the temperature is increased continuously to about 1,080° C. in the course of 15 minutes. Once this temperature has been reached, a paddle stirrer, which preferably has 3 pairs of blades, is employed, and so-called interval stirring is carried out at a stirring speed of about 150 revolutions per minute. After a stirring time of approximately 25 minutes, the temperature is reduced to about 900° C. The stirring speed thereby amounts to only about 120 revolutions per minute.

Once the melt is bubble-free, the stirring speed is reduced again to about 80 revolutions per minute, and the temperature is decreased at the same time to a casting temperature of approximately 710° C. Casting is effected in aluminum preheated to approximately 500° C. Cooling is subsequently carried out in a program-controlled tempering furnace.

What is claimed is:

1. Optical fluorophosphate glass based on Ba(PO$_3$)$_2$, Al(PO$_3$)$_3$, alkaline earth metal fluorides and AlF$_3$, said glass having a refractive index $n_e$ of between 1.47 and 1.50, an Abbe-value $\nu_e$ of between 85 and 80 and a positive anomalous partial dispersion value $+\Delta\nu_e$ of between 17 and 22, and (a) consisting essentially of the following atomic composition (in wt.-%):

| | |
|---|---|
| Mg | 0.5–3.0 |
| Ca | 8–10 |
| Sr | 12–20 |
| Ba | 9–12 |
| Al | 7–9 |
| Ti | 0–1 |
| Na | 0–1 |
| K | 0–3 |
| P | 5–9 |
| O | 8–12 |
| F | 35–38 |
| H | 0–0.5 and |

(b) having the following physical characteristics:
Linear thermal expansion coefficient $\alpha_{20/300°C}.[10^{-6}\cdot 1/°C.]$: 14.6–14.7;

| | |
|---|---|
| Glass transition temp. $T_g$ | 472–480° C.; |
| Density $\zeta$ | 3.51–3.61 g/cm$^3$; |
| Knoop-hardness HK | 385–390. |

2. Glass according to claim 1, having an index of refraction $n_e$ between 1.48 and 1.49, an Abbe-value $\nu_e$ between 84.1 and 81.4 and a positive anomalous partial dispersion value $+\Delta\nu_e$ between 18.2 and 21.0, and consisting essentially of the following atomic composition (in wt.-%):

| | |
|---|---|
| Mg | 1.0–2.2 |
| Ca | 9.1–9.8 |
| Sr | 13.1–19.0 |
| Ba | 10.0–10.8 |
| Al | 8.2–8.5 |
| Ti | 0–0.2 |
| Na | 0–0.4 |
| K | 0–1.9 |
| P | 6.1–7.1 |
| O | 9.4–11.0 |
| F | 36.0–36.2 |
| H | 0–0.1. |

3. Glass according to claim 1, having an index of refraction $n_e$ of 1.48, an Abbe-value $\nu_e$ of 84.1 and a positive anomalous partial dispersion value $+\Delta\nu_e$ of 21, and (a) consisting essentially of the following atomic composition (in wt.-%):

| | |
|---|---|
| Mg | 1.1 |
| Ca | 9.8 |
| Sr | 19.0 |
| Ba | 10.0 |
| Al | 8.5 |
| P | 6.1 |
| O | 9.4 |
| F | 36.1 and |

(b) having the following physical characteristics: Linear thermal expansion coefficient $\alpha_{20/300}°C.[10^{-6}\cdot1/°C.]$: 14.7;

| | |
|---|---|
| Glass transition temp. $T_g$ | 480° C.; |
| Density $\zeta$ | 3.61 g/cm$^3$; |
| Knoop-hardness HK | 385. |

4. Glass according to claim 1, having a refractive index $n_e$ of 1.487, an Abbe-value $\nu_e$ of 81.4 and a positive anomalous partial dispersion value $+\Delta\nu_e$ of 18.2, and (a) consisting essentially of the following atomic composition (in wt.-%):

| | |
|---|---|
| Mg | 2.18 |
| Ca | 9.19 |
| Sr | 13.18 |
| Ba | 10.78 |
| Al | 8.22 |
| Ti | 0.12 |
| Na | 0.36 |
| K | 1.85 |
| P | 7.07 |
| O | 10.95 |
| F | 36.06 |
| H | 0.04 and |

(b) having the following physical characteristics: Linear thermal expansion coefficient $\alpha_{20/300}°C.[10^{-6}\cdot1/°C.]$: 14.6;

| | |
|---|---|
| Glass transition temp. $T_g$ | 472° C.; |
| Density $\zeta$ | 3.51 g/cm$^3$; |
| Knoop-hardness HK | 390. |

* * * * *